US009560688B2

(12) United States Patent
Morita

(10) Patent No.: US 9,560,688 B2
(45) Date of Patent: Jan. 31, 2017

(54) MOBILE COMMUNICATION SYSTEM, USER TERMINAL, COMMUNICATION CONTROL APPARATUS, AND COMMUNICATION CONTROL METHOD

(71) Applicant: KYOCERA CORPORATION, Kyoto (JP)

(72) Inventor: Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/424,804

(22) PCT Filed: Aug. 23, 2013

(86) PCT No.: PCT/JP2013/072605
§ 371 (c)(1),
(2) Date: Feb. 27, 2015

(87) PCT Pub. No.: WO2014/034571
PCT Pub. Date: Mar. 6, 2014

(65) Prior Publication Data
US 2015/0223280 A1    Aug. 6, 2015

Related U.S. Application Data

(60) Provisional application No. 61/694,578, filed on Aug. 29, 2012.

(51) Int. Cl.
*H04W 4/00* (2009.01)
*H04W 76/02* (2009.01)
(Continued)

(52) U.S. Cl.
CPC .......... *H04W 76/023* (2013.01); *H04W 8/005* (2013.01); *H04W 72/02* (2013.01); *H04W 72/04* (2013.01); *H04W 92/18* (2013.01)

(58) Field of Classification Search
CPC .... H04W 76/02; H04W 76/023; H04W 76/04; H04W 76/043; H04W 72/02; H04W 72/04; H04W 72/0406; H04W 92/18; H04W 8/005
See application file for complete search history.

(56) References Cited

U.S. PATENT DOCUMENTS 7,912,489 B2    3/2011  Adachi et al.
8,233,495 B2 *  7/2012  Qi .......................... H04L 41/12
                                                            370/338
(Continued)

FOREIGN PATENT DOCUMENTS

JP    2006-333271 A    12/2006
WO   2011/116017 A1    9/2011

OTHER PUBLICATIONS

International Search Report; PCT/JP2013/072605; Sep. 24, 2013.
(Continued)

*Primary Examiner* — Kevin Mew
(74) *Attorney, Agent, or Firm* — Studebaker & Brackett PC

(57) ABSTRACT

A mobile communication system, which supports D2D communication that is direct device-to-device communication that is performed by using a radio resource assigned from a network, comprises a user terminal that transmits a message for starting the D2D communication to the network when another user terminal that should be selected as a communication partner in the D2D communication is discovered. The network comprises a communication control device that determines whether to permit the D2D communication performed by the user terminal and the other user terminal on the basis of the message received from the user terminal.

10 Claims, 9 Drawing Sheets

(51) Int. Cl.
*H04W 72/04* (2009.01)
*H04W 92/18* (2009.01)
*H04W 8/00* (2009.01)
*H04W 72/02* (2009.01)

(56) References Cited

U.S. PATENT DOCUMENTS

| | | | | |
|---|---|---|---|---|
| 8,660,028 B2* | 2/2014 | Patil | ............... | H04W 8/005 370/252 |
| 2006/0268816 A1 | 11/2006 | Adachi et al. | | |
| 2009/0016353 A1* | 1/2009 | Li | ............... | H04W 8/005 370/395.3 |
| 2010/0009675 A1 | 1/2010 | Wijting et al. | | |
| 2011/0069636 A1* | 3/2011 | Shao | ............... | H04W 72/02 370/254 |
| 2011/0317569 A1* | 12/2011 | Kneckt | ............... | H04W 74/0833 370/252 |
| 2012/0115518 A1* | 5/2012 | Zeira | ............... | H04W 8/005 455/500 |
| 2012/0163235 A1* | 6/2012 | Ho | ............... | H04W 76/023 370/254 |
| 2012/0269115 A1* | 10/2012 | Esteves | ............... | H04L 5/0053 370/328 |
| 2013/0109301 A1* | 5/2013 | Hakola | ............... | H04W 76/023 455/39 |
| 2013/0250771 A1* | 9/2013 | Yu | ............... | H04W 76/023 370/241 |
| 2014/0078971 A1* | 3/2014 | Bontu | ............... | H04W 8/005 370/329 |

OTHER PUBLICATIONS

3GPP TR 22.803 V0.3.0 (May 2012); 3rd Generation Partnership Project; Technical Specification Group SA; Feasibility Study for Proximity Services (ProSe)(Release 12).

The extended European search report issued by the European Patent Office on Mar. 10, 2016, which corresponds to European Patent Application No. 13834121.9-1857 and is related to U.S. Appl. No. 14/424,804.

* cited by examiner

FIG. 8
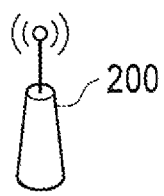
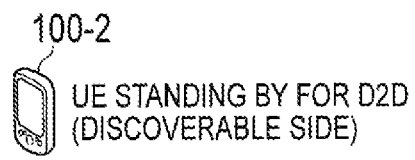
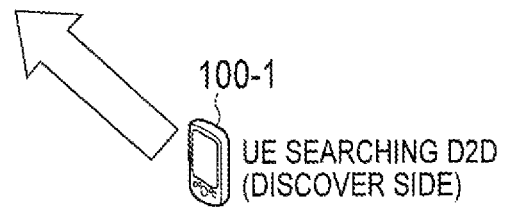

MOBILE COMMUNICATION SYSTEM, USER TERMINAL, COMMUNICATION CONTROL APPARATUS, AND COMMUNICATION CONTROL METHOD

TECHNICAL FIELD

The present invention relates to a mobile communication system that supports D2D communication, a user terminal thereof, a communication control apparatus thereof, and communication control method thereof.

BACKGROUND ART

In 3GPP (3rd Generation Partnership Project) which is a project aiming to standardize a mobile communication system, the introduction of Device to Device (D2D) communication is discussed as a new function after Release 12 (see Non Patent Document 1).

In the D2D communication, a plurality of user terminals adjacent to one another perform direct radio communication in a frequency band assigned to a mobile communication system. It is noted that the D2D communication is also called Proximity Service communication.

PRIOR ART DOCUMENT

Non-Patent Document

Non-Patent Document 1: 3GPP technical report "TR 22.803 V0.3.0" May 2012

SUMMARY OF THE INVENTION

The current specifications have a problem in that there is no mechanism for appropriately controlling the D2D communication.

Therefore, the present invention provides a mobile communication system capable of appropriately controlling D2D communication, a user terminal, a communication control apparatus, and communication control method.

According to an embodiment, a mobile communication system, which supports D2D communication that is direct device-to-device communication that is performed by using a radio resource assigned from a network, comprises: a user terminal that transmits a message for starting the D2D communication to the network when another user terminal that should be selected as a communication partner in the D2D communication is discovered. The network comprises: a communication control device that determines whether to permit the D2D communication performed by the user terminal and the other user terminal on the basis of the message received from the user terminal.

According to an embodiment, a user terminal, which supports D2D communication that is direct device-to-device communication that is performed by using a radio resource assigned from a network, comprises: a control unit that controls so that a message for starting the D2D communication is transmitted to the network when another user terminal that should be selected as a communication partner in the D2D communication is discovered.

According to an embodiment, a communication control device provided in a network in a mobile communication system, which supports D2D communication that is direct device-to-device communication that is performed by using a radio resource assigned from the network, comprises: a control unit that determines whether to permit the D2D communication performed by a user terminal and another user terminal on the basis of a message received from the user terminal. The message is transmitted from the user terminal when the user terminal discovers the other user terminal.

According to an embodiment, a communication control method in a mobile communication system, which supports D2D communication that is direct device-to-device communication that is performed by using a radio resource assigned from a network, comprises: a step of transmitting, by a user terminal, a message for starting the D2D communication to the network when another user terminal that should be selected as a communication partner in the D2D communication is discovered; and a step of determining, by the network, whether to permit the D2D communication performed by the user terminal and the other user terminal on the basis of the message received from the user terminal.

BRIEF DESCRIPTION OF THE DRAWINGS

FIG. 8 is a diagram for explaining a discovery process according to a first embodiment.

DESCRIPTION OF THE EMBODIMENT

Overview of Embodiment

Figure 1:
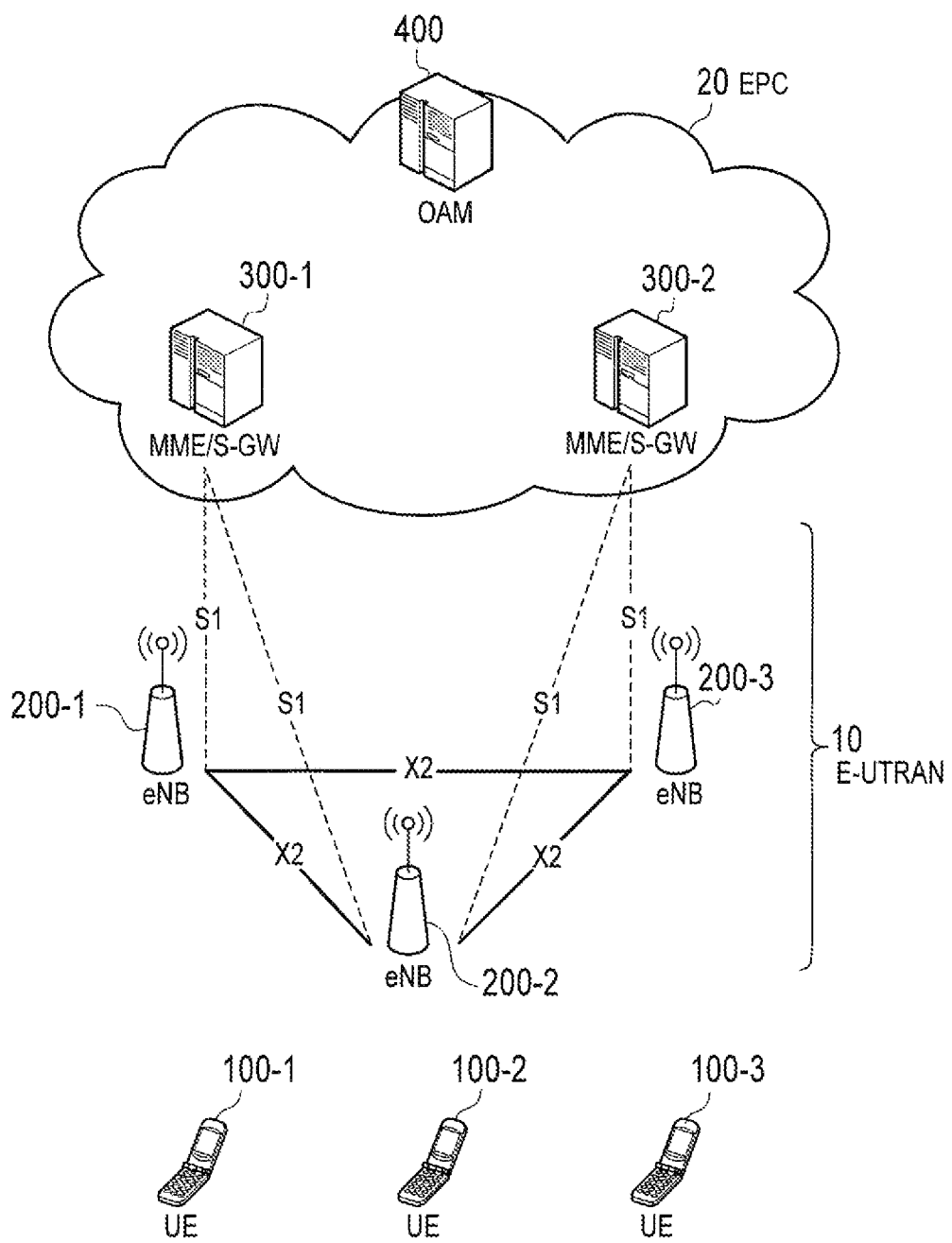
FIG. 1 is a configuration diagram of an LTE system.

A mobile communication system according to an embodiment supports D2D communication that is direct device-to-device communication that is performed by using a radio resource assigned from a network. The mobile communication system includes a user terminal that transmits a message for starting the D2D communication to the network when another user terminal that should be selected as a communication partner in the D2D communication is discovered. The network includes a communication control device that determines whether to permit the D2D communication performed by the user terminal and the other user terminal on the basis of the message received from the user terminal. Thereby, whether the D2D communication is possible can be appropriately determined at the network side.

It is noted that the "message" may include a message for requesting the start of the D2D communication or a message for notifying that the communication partner is discovered. However, the former case will be mainly described. Furthermore, the "communication control device" may include an upper device positioned above a base station, and may be a base station. However, the former case will be mainly described.

In an embodiment, when the state where the other user terminal is discovered is maintained, the user terminal repeatedly transmits the message to the network. After the message was initially received, when the message is newly received after a predetermined time lapses, the communication control device permits the D2D communication performed by the user terminal and the other user terminal. As a result, it becomes possible to start the D2D communication after confirming a situation where the D2D communication can be continuously performed (that is, a situation where each user terminal is adjacent to each other is maintained).

In an embodiment, after the message was initially received, when the message is newly received before the predetermined time lapses, the communication control device notifies: the user terminal; and/or the other user terminal of the fact that the start of the D2D communication performed by the user terminal and the other user terminal is deferred. Thereby, the user terminal is possible to recognize that the start of the D2D communication is deferred.

In an embodiment, when the user terminal and the other user terminal camp on different cells, the communication control device sets the predetermine time to be long as compared with the case in which the user terminal and the other user terminal camp on the same cell. Thereby, when the user terminals camp on different cells (that is, when there is a communication environment not corresponding to the D2D communication), it is possible to impose a strict condition for starting the D2D communication.

In an embodiment, when the user terminal and the other user terminal camp on different cells, the communication control device determines whether to permit the D2D communication performed by the user terminal and the other user terminal on the basis of further radio resources assigned to the D2D communication in the cells. Thereby, even when the user terminals camp on the different cells, it is possible to appropriately determine whether the D2D communication is possible in consideration of a setting status of the radio resource of each cell.

In an embodiment, when the user terminal and the other user terminal camp on different cells and there is no coincident part in the radio resources assigned to the D2D communication in the cells, the communication control device rejects the D2D communication performed by the user terminal and the other user terminal. Thereby, in consideration of a setting status of the radio resource of each cell, when the D2D communication is not possible, it is possible to prevent the D2D communication from starting.

In an embodiment, when the user terminal and the other user terminal camp on different cells and the radio resources assigned to the D2D communication in the cells fully or partially coincide with each other, the communication control device permits the D2D communication performed by the user terminal and the other user terminal. Thereby, in consideration of a setting status of the radio resource of each cell, it is confirmed that the D2D communication is possible, so that it is possible to start the D2D communication.

In an embodiment, when the user terminal and the other user terminal camp on different cells and the radio resources assigned to the D2D communication in the cells partially coincide with each other, the communication control device controls the D2D communication to be performed in the coincident part. Thereby, the communication control device is able to control radio resource assignment in the D2D communication.

In an embodiment, when the user terminal and the other user terminal camp on different cells and the radio resources assigned to the D2D communication in the cells partially coincide with each other, the communication control device notifies a cell having more available radio resources in the coincident part such that the cell determines a radio resource to be assigned to the D2D communication performed by the user terminal and the other user terminal. Thereby, an appropriate cell is able to control radio resource assignment in the D2D communication.

First Embodiment

A description will be provided for an embodiment in which D2D communication is introduced to a mobile communication system (hereinafter, an "LTE system") configured in conformity to the 3GPP standards, below.

(LTE System)

FIG. 1 is a configuration diagram of an LTE system according to the present embodiment.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 controls a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes MMES (Mobility management Entities)/S-GWs (Serving-Gateways) 300, and OAM (Operation and Maintenance) 400. In the present embodiment, the MME/S-GW 300 corresponds to the communication control device.

The MME is a network node for performing various mobility controls, etc., for the UE 100 and corresponds to a controller. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
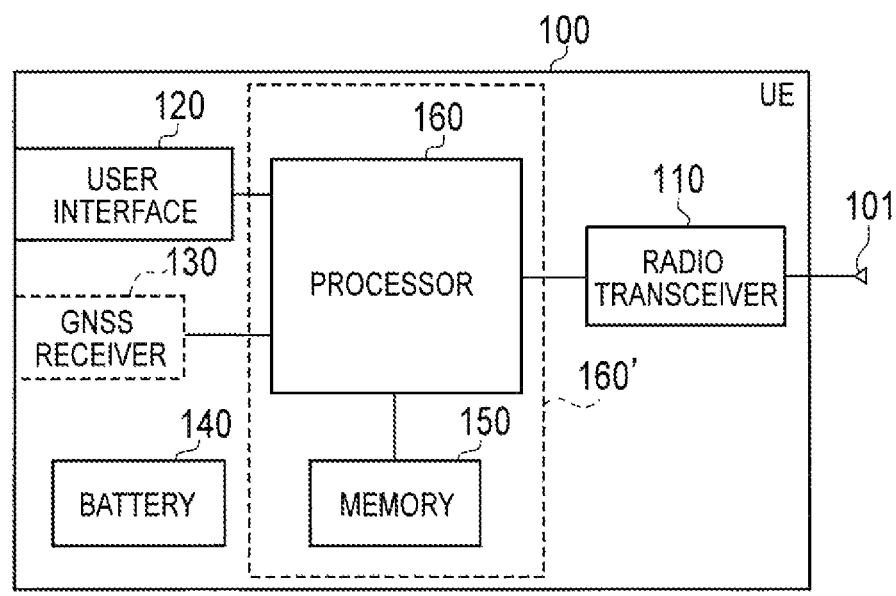
FIG. 2 is a block diagram of UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, coding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

Figure 3:
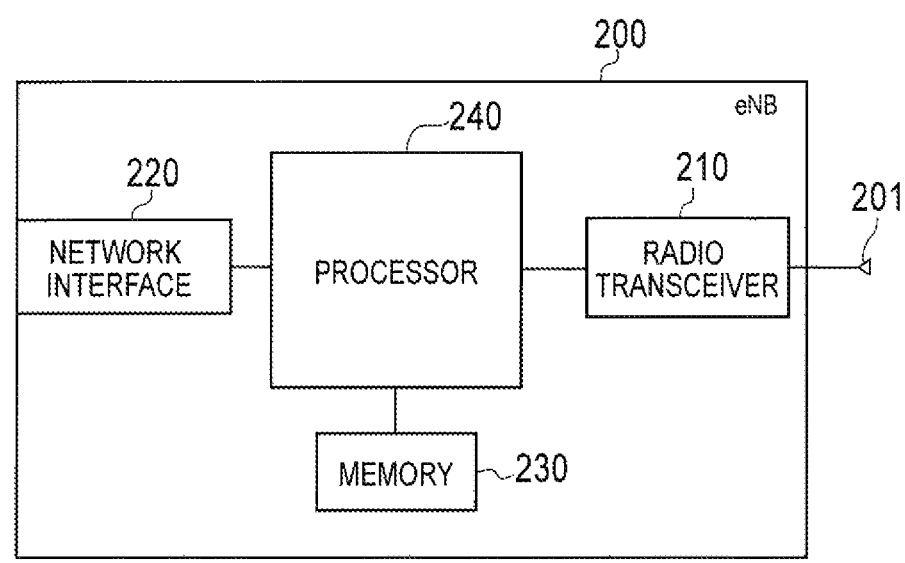
FIG. 3 is a block diagram of eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, and encoding and decoding of the baseband signal and a CPU that perform various processes by executing the program stored in the memory 230. The processor 240 implements various processes and various communication protocols described later. Also, the memory 230 may be integrally formed with the processor 240, and this set (that is, a chipset) may be called a processor.

Figure 4:
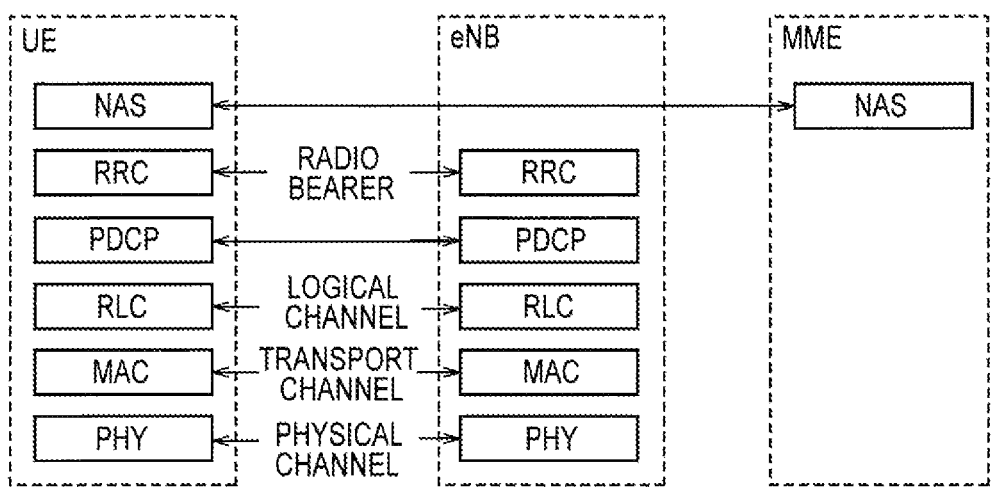
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs preferential control of data, and a retransmission process and the like by hybrid ARQ (HARQ). Between the MAC layer of the UE 100 and the MAC layer of the eNB 200, data is transmitted through a transport channel. The MAC layer of the eNB 200 includes a transport format of an uplink and a downlink (a transport block size, a modulation and coding scheme, and the like) and a MAC scheduler for determining a resource block to be assigned.

The RLC layer transmits data to an RLC layer of a reception side by using the functions of the MAC layer and the PHY layer. Between the RLC layer of the UE 100 and the RLC layer of the eNB 200, data is transmitted through a logical channel.

The PDCP layer performs header compression and decompression, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connected state, and when the RRC connection is not established, the UE 100 is in an idle state.

A NAS (Non-Access Stratum) layer positioned above the RRC layer performs session management or mobility management, for example.

Figure 5:
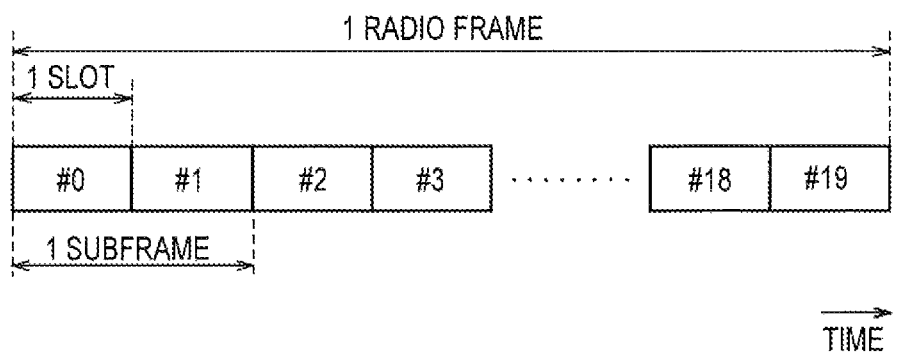
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is employed in a downlink, and SC-FDMA (Single Carrier Frequency Division Multiple Access) is employed in an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the remaining interval of each subframe is a region mainly used as a physical downlink shared channel (PDSCH). Moreover, in each subframe, cell-specific reference signals (CRSs) are distributed and arranged.

In the uplink, both ends in the frequency direction of each subframe are control regions mainly used as a physical uplink control channel (PUCCH). Furthermore, the center portion in the frequency direction of each subframe is a region mainly used as a physical uplink shared channel (PUSCH). Moreover, in each subframe, a demodulation reference signal (DMRS) and a sounding reference signal (SRS) are arranged. Specifically, the DMRS is arranged at the fourth symbol of each slot in the case of normal CP and is arranged at the third symbol of each slot in the case of expanded CP. The SRS is arranged at the final symbol of a subframe.

(D2D Communication)

Next, description is given by comparing the D2D communication with the normal communication (the cellular communication) in the LTE system.

Figure 6:
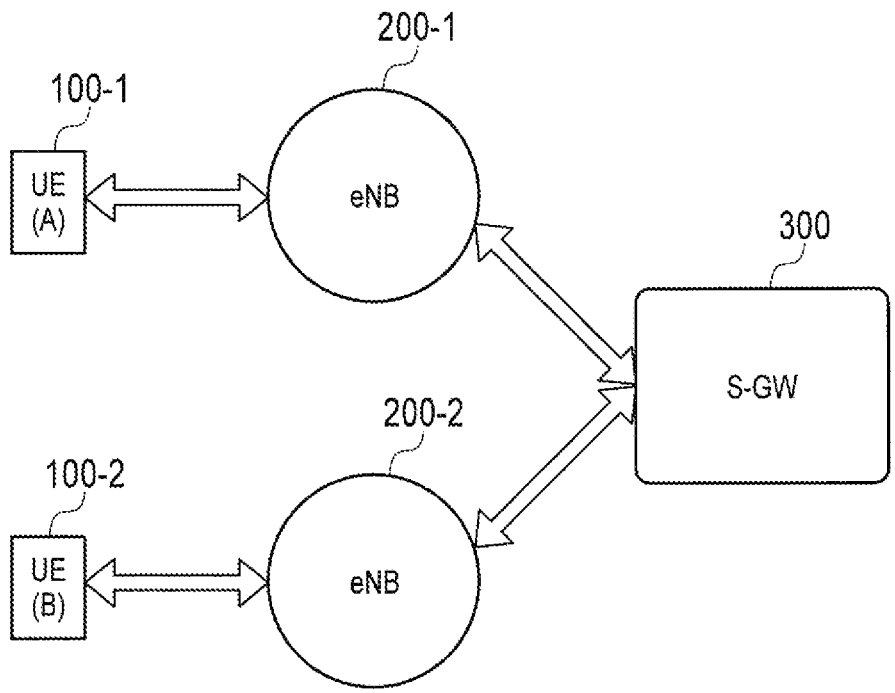
FIG. 6 is a diagram for explaining a data path in cellular communication.

FIG. 6 illustrates a data path in the cellular communication. In this case, FIG. 6 illustrates the case in which the cellular communication is performed between UE 100-1 that establishes a connection with eNB 200-1 and UE 100-2 that establishes a connection with eNB 200-2. It is noted that the data path indicates a transfer path of user data (a user plane).

As illustrated in FIG. 6, the data path of the cellular communication passes through the network. Specifically, the data path is set to pass through the eNB 200-1, the S-GW 300, and the eNB 200-2.

Figure 7:
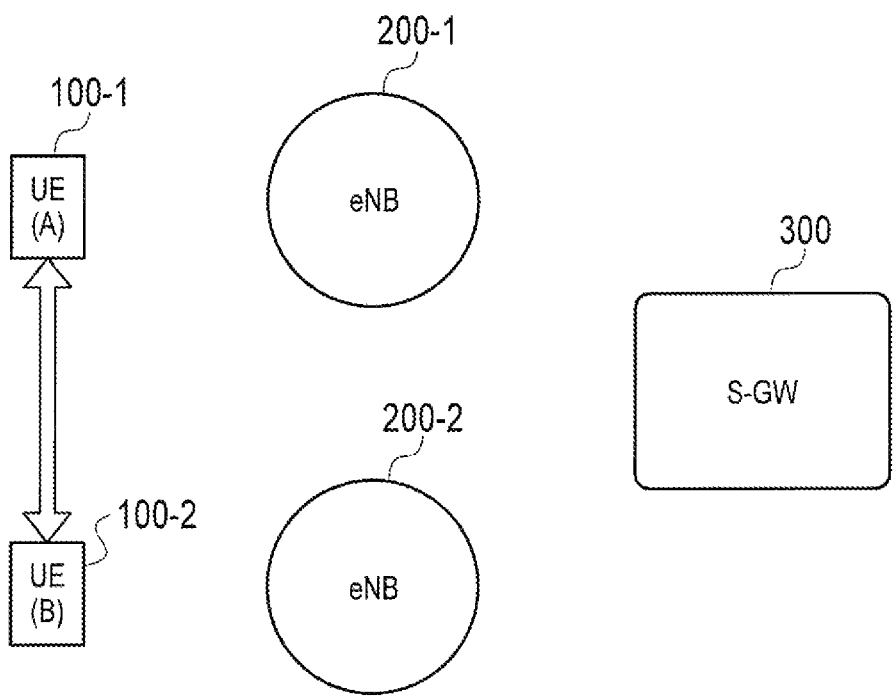
FIG. 7 is a diagram for explaining a data path in D2D communication.

FIG. 7 illustrates a data path in the D2D communication. In this case, FIG. 7 illustrates the case in which the D2D communication is performed between the UE 100-1 that establishes a connection with the eNB 200-1 and the UE 100-2 that establishes a connection with the eNB 200-2. In this case, the UE 100-1 and the UE 100-2 constitute a D2D group.

For example, one UE 100 of the UE 100-1 and the UE 100-2 discovers the other UE 100 existing in the vicinity of the one UE 100, so that the D2D communication starts. It is noted that in order to start the D2D communication, the UE 100 has a (Discover) function of discovering the other UE 100 existing in the vicinity of the UE 100. Furthermore, the UE 100 has a (Discoverable) function discovered by the other UE 100.

As illustrated in FIG. 7, the data path of the D2D communication does not pass through the network. That is, direct radio communication is performed between the UEs. As described above, when the UE 100-2 exists in the vicinity of the UE 100-1, the D2D communication is performed between the UE 100-1 and the UE 100-2, thereby obtaining an effect that a traffic load of the network and a battery consumption amount of the UE 100 are reduced, for example. It is noted that in a special mode called Locally Routed, a data path passes through the eNB 200 without passing through the S-GW 300.

Furthermore, the D2D communication is considered to be performed in a frequency band of the LTE system, and for example, in order to avoid interference to the cellular communication, the D2D communication is performed under the control of the network (eNB 200). A radio resource assignment scheme for the D2D communication mainly includes the following two schemes.

According to the first assignment scheme, the UE 100 is able to select a radio resource to be used in the D2D communication. Specifically, the network (eNB 200) transmits, to the UE 100, information indicating candidate assigned radio resources that are radio resources available for the D2D communication. The UE 100 autonomously selects a radio resource to be used in the D2D communication from the candidate assigned radio resources.

According to the second assignment scheme, the network (eNB 200) determines a radio resource to be used in the D2D communication. That is, the UE 100 has no selection right of the radio resource to be used in the D2D communication. Specifically, the eNB 200 transmits, to the UE 100, information indicating a radio resource dynamically or quasi-statically assigned for the D2D communication. The UE 100 performs the D2D communication by using the assigned radio resource.

(Discovery Process According to First Embodiment)

The UE 100 performs a discovery process for discovering another UE 100 existing in the vicinity of the UE 100 before starting the D2D communication.

FIG. 8 is a diagram for explaining a discovery process according to the present embodiment.

As illustrated in FIG. 8, firstly, the UE 100-1 searching for the UE 100-2 periodically transmits a Discover signal. The UE 100-2 periodically attempts to receive the Discover signal. When the Discover signal is received from the UE 100-1, the UE 100-2 discovers the UE 100-1 and transmits a response signal (Response) for the Discover signal to the UE 100-1. Furthermore, since the transmission of the response signal is not essential, it may be omitted. When the response signal is received from the UE 100-2, the UE 100-1 discovers the UE 100-2.

Secondly, the UE 100-1 and the UE 100-2 transmit D2D connection request messages for starting the D2D communication to the MME/S-GW 300 via the eNB 200. The D2D connection request message corresponds to a message for starting the D2D communication. The D2D connection request message, for example, includes a transmission source identifier of the message, an identifier of a communication partner UE of the D2D communication, and an identifier of an application that is used in the D2D communication.

Thirdly, when the D2D connection request messages are received from the UE 100-1 and the UE 100-2 via the eNB 200, the MME/S-GW 300 determines whether to permit the D2D communication performed by the UE 100-1 and the UE 100-2 on the basis of the received D2D connection request message. In the present embodiment, the MME/S-GW 300 corresponds to the communication control device. Furthermore, the determination is not limited to the case in which the MME/S-GW 300 performs it. For example, the determination may be performed by the eNB 200 or the OAM 400.

Furthermore, when the state where the UE 100-2 is discovered is maintained, the UE 100-1 repeatedly transmits the D2D connection request message. After the D2D connection request message was initially received, when the D2D connection request message is newly received after a deferral time determined in advance (a predetermined time) lapses, the MME/S-GW 300 permits the D2D communication performed by the UE 100-1 and the UE 100-2. Then, the MME/S-GW 300 transmits a D2D connection permission message indicating the permission of the D2D communication to the UE 100-1 and the UE 100-2 via the eNB 200.

On the other hand, after the D2D connection request message was initially received, when the D2D connection request message is newly received before the deferral time lapses, the MME/S-GW 300 notifies the UE 100-1 and the UE 100-2 of the fact that the start of the D2D communication performed by the UE 100-1 and the UE 100-2 is held.

Fourthly, after the D2D connection permission message indicating the permission of the D2D communication is received from the eNB 200, the UE 100-1 and the UE 100-2 perform the D2D communication under the control of the eNB 200.

(Operation Sequence According to First Embodiment)

Figure 9:
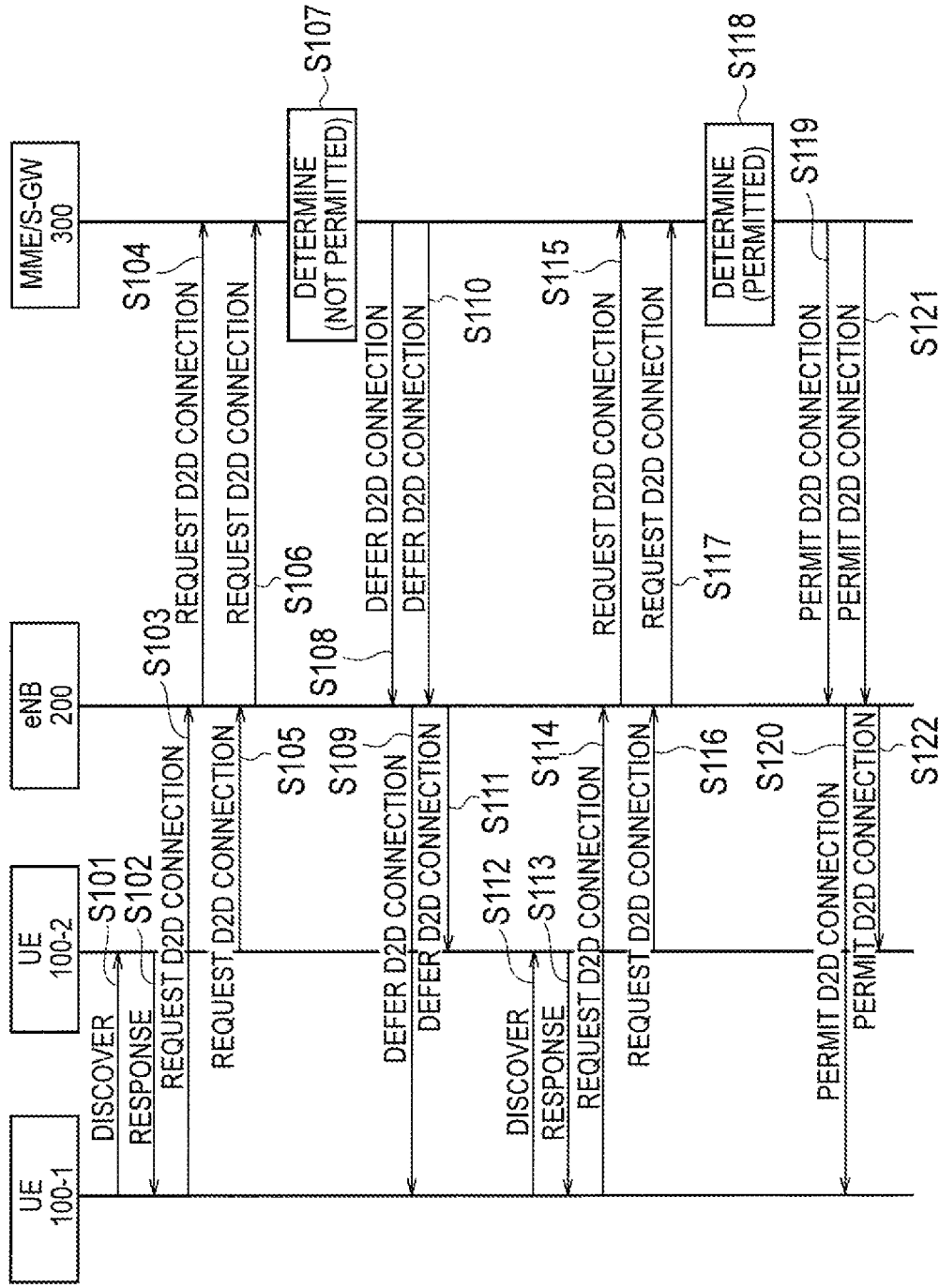
FIG. 9 is an operation sequence diagram according to the first embodiment.

FIG. 9 is an operation sequence diagram according to the present embodiment.

As illustrated in FIG. 9, in step S101, the UE 100-1 transmits the Discover signal.

In step S102, when the Discover signal is received from the UE 100-1, the UE 100-2 transmits the response signal (Response) for the Discover signal to the UE 100-1.

In step S103, the UE 100-1 transmits the D2D connection request message to the eNB 200. In step S104, the eNB 200 transfers the D2D connection request message, which was received from the UE 100-1, to the MME/S-GW 300.

In step S105, the UE 100-2 transmits the D2D connection request message to the eNB 200. In step S106, the eNB 200 transfers the D2D connection request message, which was received from the UE 100-2, to the MME/S-GW 300.

In step S107, when the D2D connection request messages are received from the UE 100-1 and the UE 100-2, the MME/S-GW 300 determines whether to permit the D2D communication performed by the UE 100-1 and the UE 100-2 on the basis of the received D2D connection request messages. In this case, since the D2D connection request messages are initially received, the MME/S-GW 300 determines that the D2D connection request messages are not permitted, and activates a timer for counting the deferral time.

In step S108, the MME/S-GW 300 transmits, to the eNB 200, a D2D connection deferral message indicating that the start of the D2D communication is held. The D2D connection deferral message may include information indicating the deferral time. In step S109, the eNB 200 transfers the D2D connection deferral message, which was received from the MME/S-GW 300, to the UE 100-1.

In step S110, the MME/S-GW 300 transmits, to the eNB 200, the D2D connection deferral message indicating that the start of the D2D communication is held. In step S111, the eNB 200 transfers the D2D connection deferral message, which was received from the MME/S-GW 300, to the UE 100-2.

In step S112, the UE 100-1 transmits the Discover signal.

In step S113, when the Discover signal is received from the UE 100-1, the UE 100-2 transmits the response signal (Response) for the Discover signal to the UE 100-1.

In step S114, the UE 100-1 transmits the D2D connection request message to the eNB 200. In step S115, the eNB 200 transfers the D2D connection request message, which was received from the UE 100-1, to the MME/S-GW 300.

In step S116, the UE 100-2 transmits the D2D connection request message to the eNB 200. In step S117, the eNB 200 transfers the D2D connection request message, which was received from the UE 100-2, to the MME/S-GW 300.

In step S118, when the D2D connection request messages are received from the UE 100-1 and the UE 100-2, the MME/S-GW 300 determines whether to permit the D2D communication performed by the UE 100-1 and the UE 100-2 on the basis of the received D2D connection request messages. Hereinafter, the following description will be given on the assumption that the timer for counting the deferral time was expired, that is, the deferral time lapsed and then the D2D connection request messages were received. In this case, the MME/S-GW 300 determines to permit the D2D communication performed by the UE 100-1 and the UE 100-2.

In step S119, the MME/S-GW 300 transmits, to the eNB 200, the D2D connection permission message indicating that the start of the D2D communication is permitted. In step S120, the eNB 200 transfers the D2D connection permission message, which was received from the MME/S-GW 300, to the UE 100-1.

In step S121, the MME/S-GW 300 transmits, to the eNB 200, the D2D connection permission message indicating that the start of the D2D communication is permitted. In step S122, the eNB 200 transfers the D2D connection permission message, which was received from the MME/S-GW 300, to the UE 100-2.

(Conclusion of First Embodiment)

As described above, when UE (a communication partner UE) to be a communication partner in the D2D communication is discovered, the UE 100 transmits the D2D connection request message for starting the D2D communication to the network. The MME/S-GW 300 determines whether to permit the D2D communication on the basis of the D2D connection request message from the UE 100. Thereby, whether the D2D communication is possible can be appropriately determined at the network side.

When the state where the communication partner UE is discovered is maintained, the UE 100 repeatedly transmits the D2D connection request message to the network. After the D2D connection request message was initially received, when the D2D connection request message is newly received after the deferral time lapses, the MME/S-GW 300 permits the D2D communication performed by the UE 100 and the communication partner UE. As a result, it becomes possible to start the D2D communication after confirming a situation where the D2D communication can be continuously performed (that is, a situation where each UE is adjacent to each other is maintained).

After the D2D connection request message was initially received, when the D2D connection request message is newly received before the deferral time lapses, the MME/S-GW 300 transmits, to: the UE 100; and/or the communication partner UE, a connection deferral message indicating that the start of the D2D communication performed by the UE 100 and the communication partner UE is held. Thereby, the UE 100 is possible to recognize that the start of the D2D communication is held.

Second Embodiment

The aforementioned first embodiment considers the case in which the UE 100 and the communication partner UE camp on the same cell (the same eNB 200). On the other hand, the second embodiment considers the case in which the UE 100 and the communication partner UE camp on different cells (different eNBs 200).

(Discovery Process According to Second Embodiment)

Figure 10:
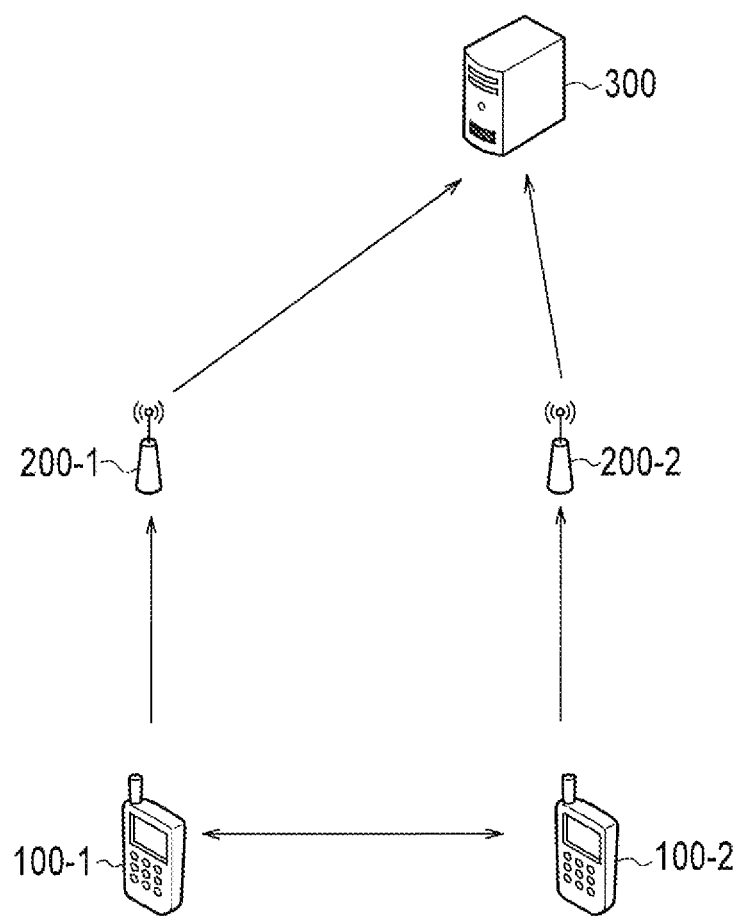
FIG. 10 is a diagram for explaining a discovery process according to a second embodiment.

FIG. 10 is a diagram for explaining a discovery process according to the present embodiment. In this case, differences from the first embodiment will be mainly described.

As illustrated in FIG. 10, firstly, the UE 100-1 searching for the UE 100-2 periodically transmits the Discover signal. The UE 100-2 periodically attempts to receive the Discover signal. When the Discover signal is received from the UE 100-1, the UE 100-2 discovers the UE 100-1 and transmits a response signal (Response) for the Discover signal to the UE 100-1. Furthermore, since the transmission of the response signal is not essential, it may be omitted. When the response signal is received from the UE 100-2, the UE 100-1 discovers the UE 100-2.

Secondly, the UE 100-1 transmits the D2D connection request message for starting the D2D communication to the MME/S-GW 300 via the eNB 200-1. The UE 100-2 transmits the D2D connection request message for starting the D2D communication to the MME/S-GW 300 via the eNB 200-2.

Thirdly, when the D2D connection request messages are received from the UE 100-1 and the UE 100-2, the MME/S-GW 300 determines whether to permit the D2D communication performed by the UE 100-1 and the UE 100-2 on the basis of the received D2D connection request messages by using the deferral time similarly to the first embodiment. In the case of permitting the D2D communication, the MME/S-GW 300 transmits the D2D connection permission message indicating the permission of the D2D communication.

Furthermore, in the present embodiment, when the UE 100-1 and the UE 100-2 camp on different cells (different eNBs 200), the MME/S-GW 300 sets the deferral time to be longer as compared with a case in which the UE 100 and the communication partner UE camp on the same cell.

Furthermore, in the present embodiment, when the UE 100-1 and the UE 100-2 camp on different cells (different eNBs 200), the MME/S-GW 300 determines whether to permit the D2D communication performed by the UE 100 and the communication partner UE on the basis of further radio resources assigned to the D2D communication in the cells.

Fourthly, after the D2D connection permission message indicating the permission of the D2D communication is received, the UE 100-1 and the UE 100-2 perform the D2D communication under the control of the MME/S-GW 300 or the eNB 200.

(Operation Flow According to Second Embodiment)

Figure 11:
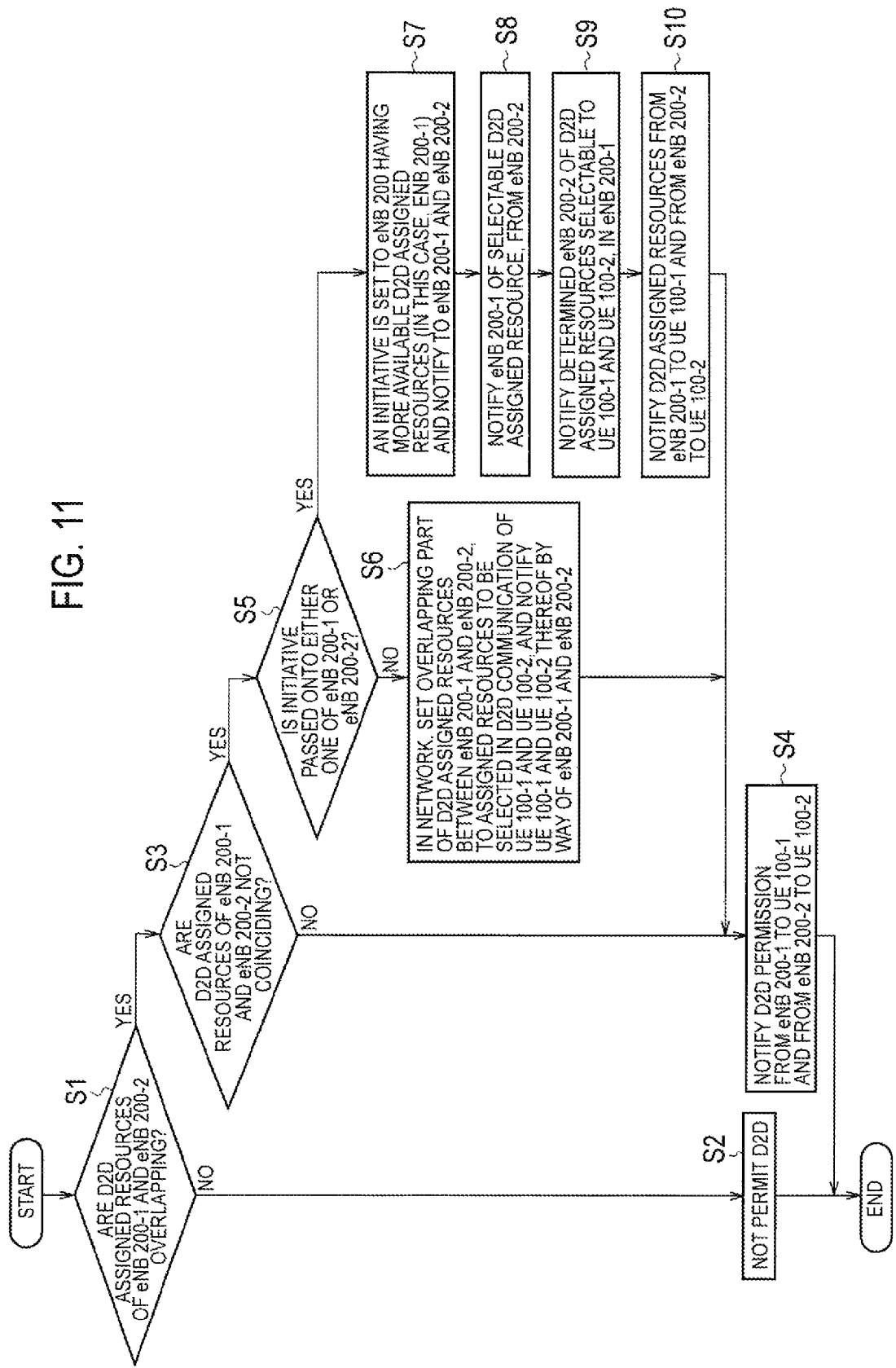
FIG. 11 is an operation flow diagram according to the second embodiment.

FIG. 11 is an operation flow diagram according to the present embodiment. Hereinafter, an operation under the situation illustrated in FIG. 10 will be described.

As illustrated in FIG. 11, in step S1, the MME/S-GW 300 determines whether there is a coincident part in radio resources (hereinafter, "D2D assigned resources") assigned to the D2D communication in each of the eNB 200-1 and the eNB 200-2. It is noted that the MME/S-GW 300 may recognize in advance the D2D assigned resource of each of the eNB 200-1 and the eNB 200-2 or may inquire of the eNB 200-1 and the eNB 200-2 about the D2D assigned resource.

When a result of the determination in step S1 is "NO", that is, when there is no coincident part in the D2D assigned resources, the MME/S-GW 300 determines to reject the D2D communication performed by the UE 100-1 and the UE 100-2 in step S2.

Meanwhile, when the result of the determination in step S1 is "YES", that is, when the D2D assigned resources fully or partially coincide with each other, the MME/S-GW 300 determines to permit the D2D communication performed by the UE 100-1 and the UE 100-2. Then, in step S3, the MME/S-GW 300 determines whether the D2D assigned resources of the eNB 200-1 and the eNB 200-2 do not coincide with each other.

When a result of the determination in step S3 is "NO", that is, when the D2D assigned resources fully coincide with each other, the MME/S-GW 300 notifies the UE 100-1 of D2D communication permission through the eNB 200-1 and notifies the UE 100-2 of the D2D communication permission through the eNB 200-2 in step S4.

Meanwhile, when the result of the determination in step S3 is "YES", that is, when the D2D assigned resources partially coincide with each other, it is necessary to adjust the D2D assigned resources between the eNB 200-1 and the eNB 200-2. In this case, in step S5, the MME/S-GW 300 determines whether to give the initiative to the eNB 200-1 or the eNB 200-2.

When a result of the determination in step S5 is "NO", that is, when the D2D assigned resources are adjusted at the initiative of the MME/S-GW 300, the MME/S-GW 300 controls the D2D communication to be performed in a coincident part (hereinafter, "a coincident D2D resource") of the D2D assigned resources of the eNB 200-1 and the eNB 200-2, in step S6. Specifically, the MME/S-GW 300 notifies the UE 100-1 of the coincident D2D resource through the eNB 200-1 and notifies the UE 100-2 of the coincident D2D resource through the eNB 200-2.

Meanwhile, when the result of the determination in step S5 is "YES", that is, when it is determined to give the initiative to the eNB 200-1 or the eNB 200-2, the MME/S-GW 300 sets the initiative in eNB 200 having more selectable radio resources (for example, non-assigned radio resources) in the coincident D2D resource, in step S7. Hereinafter, the following description will be given on the assumption that the MME/S-GW 300 sets the initiative in the eNB 200-1. In this case, the MME/S-GW 300 notifies the eNB 200-1 and the eNB 200-2 of the fact that the initiative was set in the eNB 200-1.

Then, in step S8, the eNB 200-2 notifies the eNB 200-1 of the selectable radio resources of the eNB 200-2. In step S9, the eNB 200-1 determines a radio resource to be assigned to the D2D communication performed by the UE 100-1 and the UE 100-2 on the basis of the notification from the eNB 200-2, and notifies the eNB 200-2 of the determined radio resource. In step S10, the eNB 200-1 notifies the UE 100-1 of the radio resource determined in step S9, and the eNB 200-2 notifies the UE 100-2 of the radio resource determined in step S9.

(Operation Sequence According to Second Embodiment)

Figure 12:
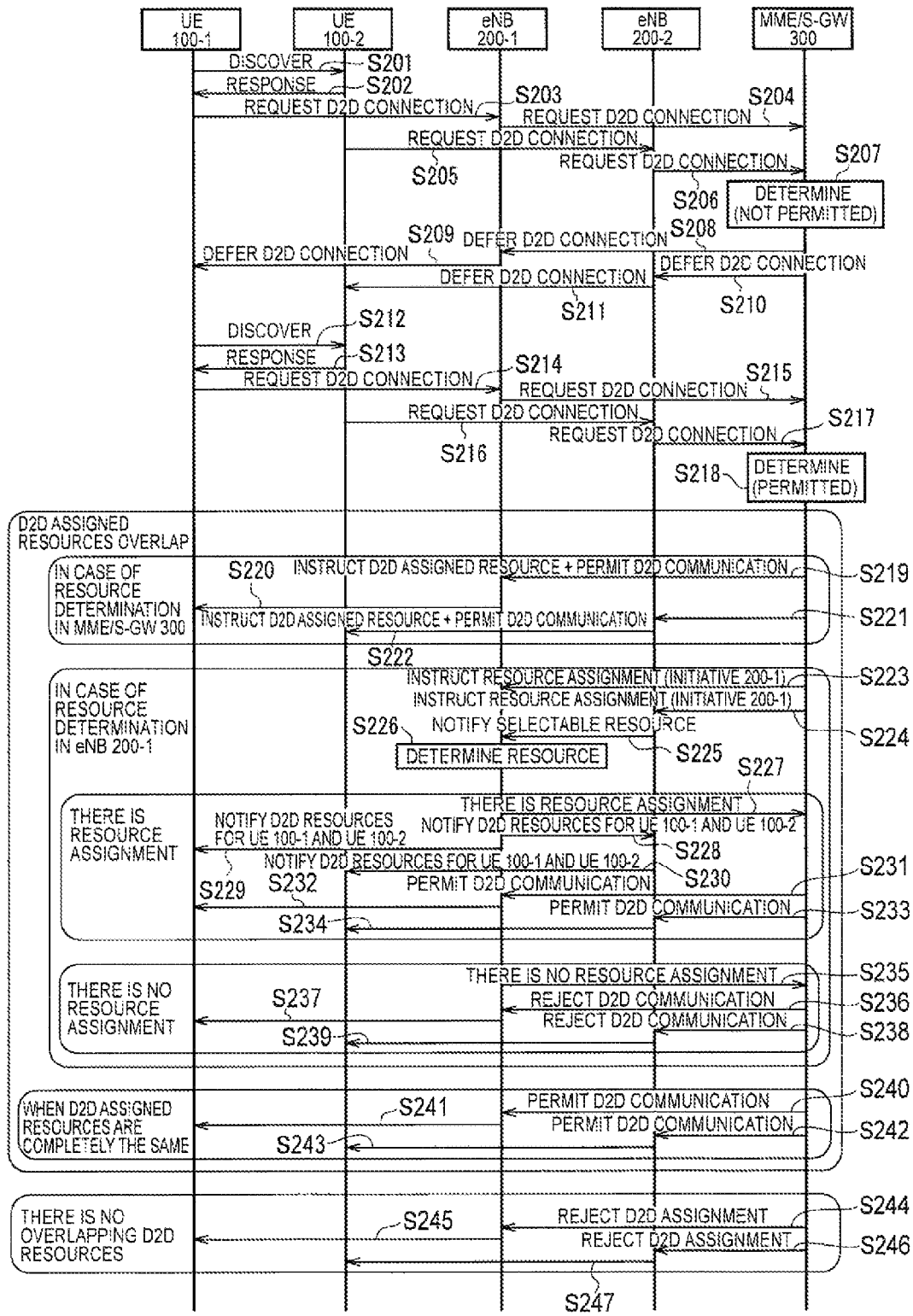
FIG. 12 is an operation sequence diagram according to the second embodiment.

Next, an operation sequence according to the operation flow illustrated in FIG. 11 will be described. FIG. 12 is an operation sequence diagram according to the present embodiment.

As illustrated in FIG. 12, in step S201, the UE 100-1 transmits the Discover signal.

In step S202, when the Discover signal is received from the UE 100-1, the UE 100-2 transmits the response signal (Response) for the Discover signal to the UE 100-1.

In step S203, the UE 100-1 transmits the D2D connection request message to the eNB 200-1. In step S204, the eNB 200-1 transfers the D2D connection request message, which was received from the UE 100-1, to the MME/S-GW 300.

In step S205, the UE 100-2 transmits the D2D connection request message to the eNB 200-2. In step S206, the eNB 200-2 transfers the D2D connection request message, which was received from the UE 100-2, to the MME/S-GW 300.

In step S207, when the D2D connection request messages are received from the UE 100-1 and the UE 100-2, the MME/S-GW 300 determines whether to permit the D2D communication performed by the UE 100-1 and the UE 100-2 on the basis of the received D2D connection request messages. In this case, since the D2D connection request messages are initially received, the MME/S-GW 300 determines that the D2D connection request messages are not permitted, and activates a timer for counting the deferral time.

In step S208, the MME/S-GW 300 transmits, to the eNB 200-1, the D2D connection deferral message indicating that the start of the D2D communication is held. In step S209, the eNB 200-1 transfers the D2D connection deferral message, which was received from the MME/S-GW 300, to the UE 100-1.

In step S210, the MME/S-GW 300 transmits, to the eNB 200-2, the D2D connection deferral message indicating that the start of the D2D communication is held. In step S211, the eNB 200-2 transfers the D2D connection deferral message, which was received from the MME/S-GW 300, to the UE 100-2.

In step S212, the UE 100-1 transmits the Discover signal.

In step S213, when the Discover signal is received from the UE 100-1, the UE 100-2 transmits the response signal (Response) for the Discover signal to the UE 100-1.

In step S214, the UE 100-1 transmits the D2D connection request message to the eNB 200-1. In step S215, the eNB 200-1 transfers the D2D connection request message, which was received from the UE 100-1, to the MME/S-GW 300.

In step S216, the UE 100-2 transmits the D2D connection request message to the eNB 200-2. In step S217, the eNB 200-2 transfers the D2D connection request message, which was received from the UE 100-2, to the MME/S-GW 300.

In step S218, when the D2D connection request messages are received from the UE 100-1 and the UE 100-2, the MME/S-GW 300 determines whether to permit the D2D communication performed by the UE 100-1 and the UE 100-2 on the basis of the received D2D connection request messages. Hereinafter, the following description will be given on the assumption that the timer for counting the deferral time was expired, that is, the deferral time lapsed and then the D2D connection request messages were received.

In this case, the MME/S-GW 300 determines to permit the D2D communication performed by the UE 100-1 and the UE 100-2. Furthermore, the MME/S-GW 300 determines whether there is a coincident part in the D2D assigned resources of the eNB 200-1 and the eNB 200-2. Subsequent operation patterns to be performed vary depending on setting states of the D2D assigned resources of the eNB 200-1 and the eNB 200-2 as described above. Hereinafter, each operation pattern will be described.

Pattern 1: When the D2D assigned resources of the eNB 200-1 and the eNB 200-2 partially coincide with each other and resource determination is performed at the initiative of the MME/S-GW 300, the MME/S-GW 300 notifies the UE 100-1 of D2D communication permission and a D2D resource through the eNB 200-1 (steps S219 and S220) and notifies the UE 100-2 of the D2D communication permission and the D2D resource through the eNB 200-2 (steps S221 and S222).

Pattern 2: When the D2D assigned resources of the eNB 200-1 and the eNB 200-2 partially coincide with each other and the resource determination is performed at the initiative of the eNB 200-1, the MME/S-GW 300 notifies the eNB 200-1 and the eNB 200-2 of the fact that the initiative was set in the eNB 200-1 (steps S223 and S224). Then, in step S225, the eNB 200-2 notifies the eNB 200-1 of the selectable radio resources of the eNB 200-2. In step S226, the eNB 200-1 determines a radio resource to be assigned to the D2D communication performed by the UE 100-1 and the UE 100-2 on the basis of the notification from the eNB 200-2.

Pattern 2-1: When there is a radio resource to be assigned to the D2D communication as a result of the determination in step S226, the eNB 200-1 notifies the MME/S-GW 300 of the fact that there is the radio resource to be assigned to the D2D communication (step S227), and notifies the eNB 200-2 and the UE 100-1 of the radio resource to be assigned to the D2D communication performed by the UE 100-1 and the UE 100-2 (steps S228 and S229). Furthermore, the eNB 200-2 notifies the UE 100-2 of the radio resource to be assigned to the D2D communication performed by the UE 100-1 and the UE 100-2 (steps S230). Moreover, the MME/S-GW 300 notifies the UE 100-1 of D2D communication permission through the eNB 200-1 (steps S231 and S232) and notifies the UE 100-2 of the D2D communication permission through the eNB 200-2 (steps S233 and S234).

Pattern 2-2: When there is no radio resource to be assigned to the D2D communication as a result of the determination in step S226, the eNB 200-1 notifies the MME/S-GW 300 of the fact that there is no radio resource to be assigned to the D2D communication (step S235). The MME/S-GW 300 notifies the UE 100-1 of D2D communication rejection through the eNB 200-1 (steps S236 and S237) and notifies the UE 100-2 of the D2D communication rejection through the eNB 200-2 (steps S238 and S239).

Pattern 3: When the D2D assigned resources of the eNB 200-1 and the eNB 200-2 fully coincide with each other, the MME/S-GW 300 notifies the UE 100-1 of D2D communication permission through the eNB 200-1 (steps S240 and S241) and notifies the UE 100-2 of the D2D communication permission through the eNB 200-2 (steps S242 and S243).

Pattern 4: When there is no coincident part in the D2D assigned resources of the eNB 200-1 and the eNB 200-2, the MME/S-GW 300 notifies the UE 100-1 of D2D assignment rejection through the eNB 200-1 (steps S244 and S245) and notifies the UE 100-2 of the D2D assignment rejection through the eNB 200-2 (steps S246 and S247).

(Conclusion of Second Embodiment)

As described above, when the UE 100 and the communication partner UE camp on different cells, the MME/S-GW 300 sets the deferral time to be long as compared with the case in which the UE 100 and the communication partner UE camp on the same cell. Thereby, when the UEs 100 camp on different cells (that is, when there is a communication environment not corresponding to the D2D communication), it is possible to impose a strict condition for starting the D2D communication.

When the UE 100 and the communication partner UE camp on different cells, the MME/S-GW 300 determines whether to permit the D2D communication performed by the UE 100 and the communication partner UE on the basis of further D2D assigned resources of the cells. Thereby, even when the UEs 100 camp on the different cells, it is possible to appropriately determine whether the D2D communication is possible in consideration of a setting status of the radio resource in each cell.

When the UE 100 and the communication partner UE camp on different cells and there is no coincident part in the D2D assigned resources of the cells, the MME/S-GW 300 rejects the D2D communication performed by the UE 100 and the communication partner UE. Thereby, in consideration of a setting status of the radio resource of each cell, when the D2D communication is not possible, it is possible to prevent the D2D communication from starting.

When the UE 100 and the communication partner UE camp on different cells and the D2D assigned resources of the cells partially coincide with each other, the MME/S-GW 300 controls the D2D communication to be performed in the coincident part. Thereby, the MME/S-GW 300 is able to control radio resource assignment in the D2D communication.

Alternatively, when the UE 100 and the communication partner UE camp on different cells and the D2D assigned resources of the cells partially coincide with each other, the MME/S-GW 300 notifies a cell having more available radio resources in the coincident part such that the cell determines a radio resource to be assigned to the D2D communication performed by the UE 100 and the communication partner UE. Thereby, an appropriate cell is able to control radio resource assignment in the D2D communication.

Other Embodiments

It should not be understood that the present invention is limited to the descriptions and drawings constituting a part of this disclosure. From this disclosure, a variety of alternate embodiments, examples, and applicable techniques will become apparent to one skilled in the art.

For example, an entity, which determines whether the D2D communication is possible, is not limited to the MME/S-GW 300. For example, the entity may be the OAM 400 or the eNB 200.

In the above embodiment, as one example of a mobile communication system, the LTE system is explained. However, the present invention is not limited to the LTE system, and the present invention may be applied to systems other than the LTE system.

In addition, the entire content of U.S. Provisional Application No. 61/694,578 (filed on Aug. 29, 2012) is incorporated in the present specification by reference.

INDUSTRIAL APPLICABILITY

As described above, the present invention is able to appropriately control the D2D communication, and thus is useful for a radio communication field such as mobile communication.

The invention claimed is:

1. A mobile communication system, which supports D2D communication that is direct device-to-device communication that is performed by using a radio resource assigned from a network, comprising:
a user terminal configured to transmit a message for starting the D2D communication to the network when another user terminal that should be selected as a communication partner in the D2D communication is discovered,
a communication control apparatus, in the network, configured to determine whether to permit the D2D communication performed by the user terminal and the other user terminal on the basis of the message received from the user terminal, wherein
the user terminal is further configured to repeatedly transmit the message to the network when a state where the other user terminal is discovered is maintained, and
the communication control apparatus is further configured to permit the D2D communication performed by the user terminal and the other user terminal after the message is initially received, when the message is newly received after a predetermined time lapses.

2. The mobile communication system according to claim 1, wherein, after the message is initially received, when the message is newly received before the predetermined time lapses,
the communication control apparatus is further configured to notify the user terminal and/or the other user terminal of the fact that start of the D2D communication performed by the user terminal and the other user terminal is held.

3. The mobile communication system according to claim 1, wherein the communication control apparatus is configured to set the predetermined time to be long as compared with a case in which the user terminal and the other user terminal camp on the same cell when the user terminal and the other user terminal camp on different cells.

4. A mobile communication system, which supports D2D communication that is direct device-to-device communication that is performed by using a radio resource assigned from a network, comprising:
a user terminal configured to transmit a message for starting the D2D communication to the network when another user terminal that should be selected as a communication partner in the D2D communication is discovered,
a communication control apparatus, in the network, configured to determine whether to permit the D2D communication performed by the user terminal and the other user terminal on the basis of the message received from the user terminal, wherein
the communication control apparatus is configured to determine whether to permit the D2D communication performed by the user terminal and the other user terminal on the basis of further radio resources assigned to the D2D communication in the cells when the user terminal and the other user terminal camp on different cells.

5. The mobile communication system according to claim 4, wherein the communication control apparatus is configured to reject the D2D communication performed by the user terminal and the other user terminal when the user terminal and the other user terminal camp on the different cells and there is no coincident part in the radio resources assigned to the D2D communication in the cells.

6. The mobile communication system according to claim 4, wherein the communication control apparatus is configured to control the D2D communication to be performed in a coincident part when the user terminal and the other user terminal camp on the different cells and the radio resources assigned to the D2D communication in the cells partially coincide with each other.

7. The mobile communication system according to claim 4, wherein the communication control apparatus is configured to notify a cell having more available radio resources in a coincident part such that the cell determines a radio resource to be assigned to the D2D communication performed by the user terminal and the other user terminal when the user terminal and the other user terminal camp on the different cells and the radio resources assigned to the D2D communication in the cells partially coincide with each other.

8. A user terminal, which supports D2D communication that is direct device-to-device communication that is performed by using a radio resource assigned from a network, comprising:
a transmitter configured to transmit a message for starting the D2D communication to the network when another user terminal that should be selected as a communication partner in the D2D communication is discovered, wherein
the transmitter is further configured to repeatedly transmit the message to the network when a state where the other user terminal is discovered is maintained.

9. A communication control apparatus included in a network in a mobile communication system, which supports D2D communication that is direct device-to-device communication that is performed by using a radio resource assigned from the network, comprising:
- a controller configured to determine whether to permit the D2D communication performed by a user terminal and another user terminal on the basis of a message received from the user terminal, wherein
- the message is transmitted from the user terminal when the user terminal discovers the other user terminal, and
- the controller is further configured to permit the D2D communication performed by the user terminal and the other user terminal after the message is initially received, when the message is newly received after a predetermined time lapses.

10. A communication control apparatus included in a network in a mobile communication system, which supports D2D communication that is direct device-to-device communication that is performed by using a radio resource assigned from the network, comprising:
- a controller configured to determine whether to permit the D2D communication performed by a user terminal and another user terminal on the basis of a message received from the user terminal, wherein
- the message is transmitted from the user terminal when the user terminal discovers the other user terminal,
- the controller is further configured to permit the D2D communication performed by the user terminal and the other user terminal after the message is initially received, when the message is newly received after a predetermined time lapses, and
- the controller is further configured to determine whether to permit the D2D communication performed by the user terminal and the other user terminal on the basis of further radio resources assigned to the D2D communication in the cells when the user terminal and the other user terminal camp on different cells.

* * * * *